United States Patent [19]

Takenaka

[11] 4,427,311
[45] Jan. 24, 1984

[54] TRACK ROLLER DEVICE

[76] Inventor: Hideo Takenaka, 10-16, Kugahara 6-chome, Ohta-ku, Tokyo, Japan

[21] Appl. No.: 409,756

[22] Filed: Aug. 19, 1982

Related U.S. Application Data

[63] Continuation of Ser. No. 177,160, Aug. 11, 1980, abandoned.

[30] Foreign Application Priority Data

Aug. 17, 1979 [JP] Japan ................................. 54-113203

[51] Int. Cl.³ ........................ F16C 13/00; F16C 33/10
[52] U.S. Cl. ..................................... 384/418; 384/385
[58] Field of Search ............... 384/419, 416, 417, 418, 384/275, 372, 385

[56] References Cited

U.S. PATENT DOCUMENTS

| | | | |
|---|---|---|---|
| 2,915,326 | 12/1959 | Mason | 277/178 |
| 3,515,446 | 6/1970 | Maguire | 384/418 |
| 3,744,860 | 7/1973 | Casey | 384/385 |
| 3,869,179 | 3/1975 | Ricca et al. | 384/155 |
| 3,917,362 | 11/1975 | Stedman | 384/418 |
| 4,085,981 | 4/1978 | Takenaka | 384/418 |
| 4,141,598 | 2/1979 | Cline | 384/418 X |

Primary Examiner—Stuart S. Levy
Assistant Examiner—Thomas R. Hannon
Attorney, Agent, or Firm—Flynn, Thiel, Boutell & Tanis

[57] ABSTRACT

A track roller device is disclosed having a pair of rollers that abut against each other and are fitted in one body by welding, using a single pair of bushes, which is light in weight and adapted for large oil chamber capacity and further requires few parts in the assembly thereof.

5 Claims, 3 Drawing Figures

TRACK ROLLER DEVICE

This is a continuation of application Ser. No. 177,160, filed Aug. 11, 1980, now abandoned.

BACKGROUND OF THE INVENTION

The present invention relates to a improved track roller device.

As shown in FIG. 1, a conventional track roller device is assembled as follows.

The shaft collar 1a is formed at the center part of the shaft 1 to accept a thrust. On one axial side of the shaft collar there is provided a bush collar 4 which is inserted from one axial end of the central passage 2a of the roller 2 and is press-fitted with the bush 3 having the bush flange 3a. A corresponding bushing structure is provided on the other axial side of the shaft collar so that the roller 2 is rotably supported on the shaft 1.

The flange 4a of the bush collar 4 abuts against the radially extending end surface of the roller 2 and is integrally joined with the roller 2 by the bolt 5.

The shaft collar 1a abuts against the flange 3a of the bush 3. The bush collar 4 which is press-fitted with the bush 3, is fitted in the annular gap between the shaft 1 and the central passage 2a of the roller.

The floating rings 6 and 7 are provided at both ends of the shaft 1. The covers 8 are fitted on the left and right ends of the shaft 1.

As described in the foregoing, the conventional track roller device requires a pair of bushes which are press-fitted, the bush collars for supporting the roller rotatably in relation to the shaft, and requires complicated procedures for fitting said two pairs of bushes and bush collars in the annular gap between the shaft 1 and the central passage in the last step of assembling the same. The result is that the conventional track roller device requires complicated assembly procedures and many parts for assembly, and also the capacity of the oil chamber must be decreased.

SUMMARY OF THE INVENTION

It is an object of the present invention to provide a track roller device which does not require a lot of parts for assembling the same and which is light in weight.

It is another object of the present invention to provide a track roller device which is easy to assemble.

It is still another object of the present invention to provide a track roller device whose oil chamber is large in capacity.

BRIEF DESCRIPTION OF THE DRAWINGS

The above and other objects, features and advantages of the present invention will be hereinafter described in conjunction with the accompanying drawing.

Figure 1:
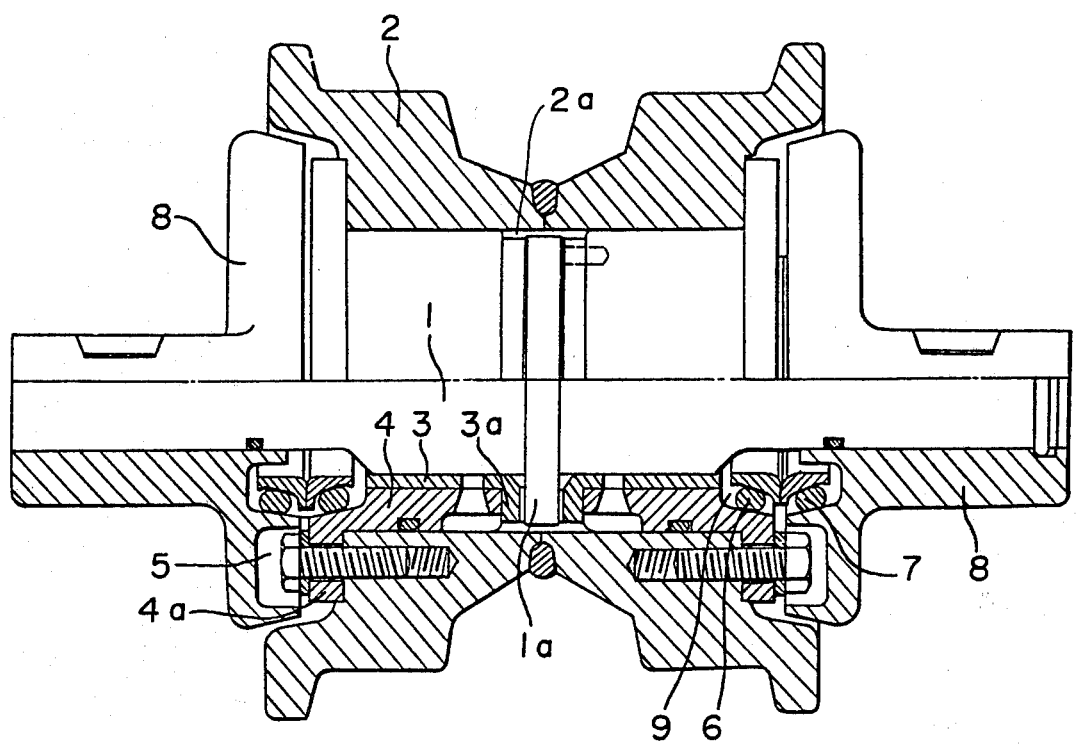
FIG. 1 is an elevational view of a conventional track roller device, partly in section, with the lower half and essential parts thereof shown in section.
Figure 2:
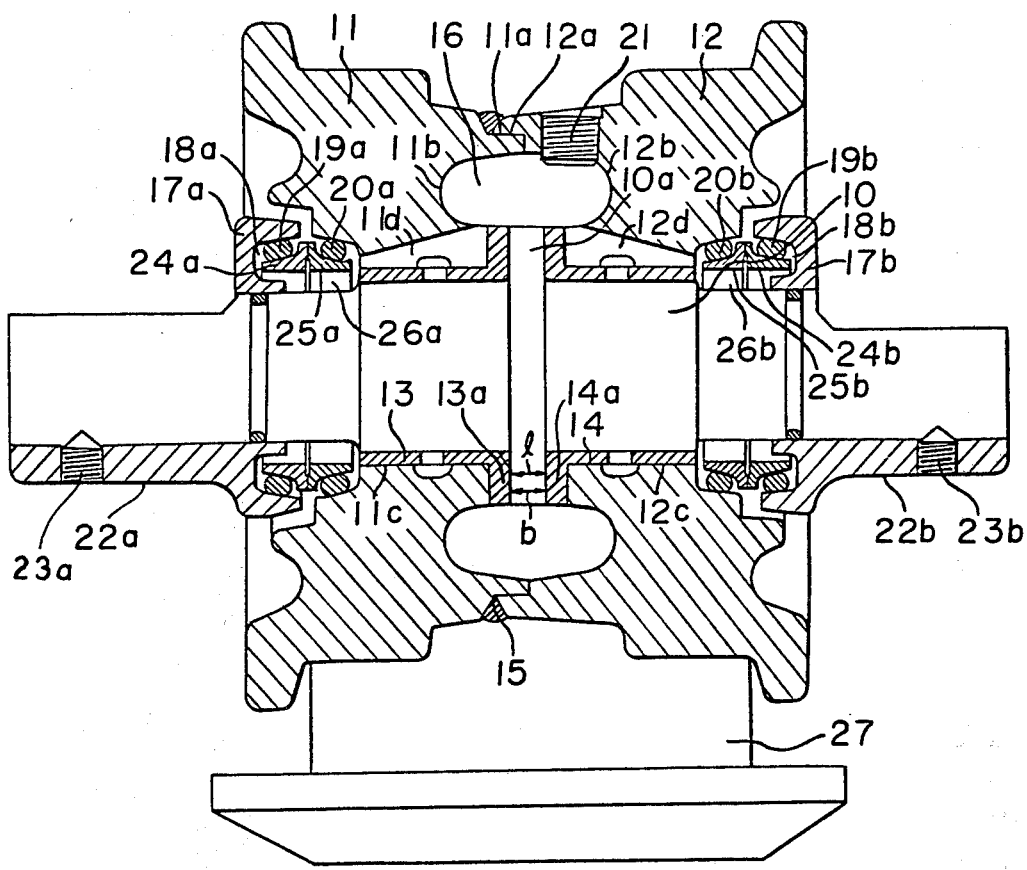
FIG. 2 is a sectional view of a track roller device according to a preferred embodiment of the present invention and FIG. 3 is an end view of the device in FIG. 2.
Figure 3:
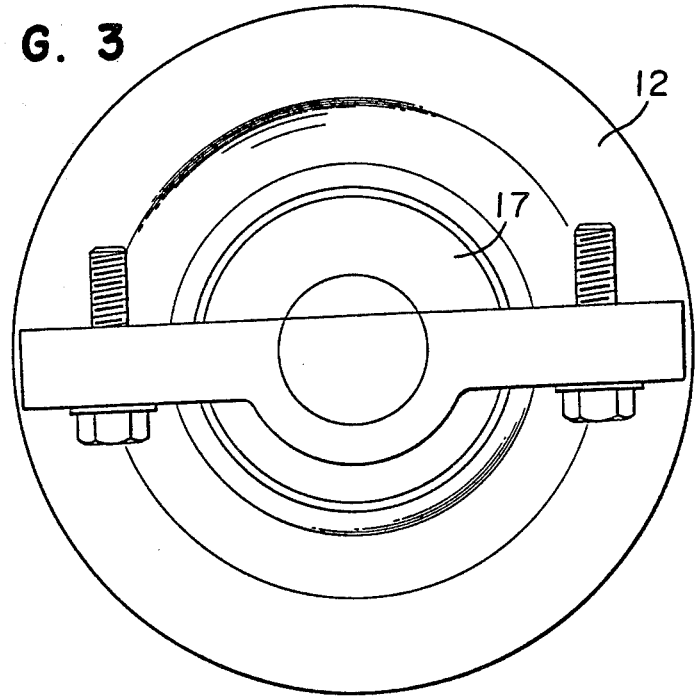

Reference is now made to FIGS. 2 and 3. Reference numerals 11 and 12 designate a pair of rollers. Reference numeral 10 designates a shaft. At the central part of the shaft, there is provided a shaft collar 10a.

The circumferentially outer surface 11a which is formed at the inner axial end of the roller 11 is fitted to the circumferentially inner surface 12a of the roller 12 which is formed at the inner axial end of the roller 12.

Annular recesses 11b and 12b are formed in the opposing axially inner, end walls of the rollers 11 and 12. The annular recesses 11b and 12b, in combination, define an annular oil chamber 16.

Reference numerals 13 and 14 designate bushes which are provided with bush flanges 13a and 14a and are press-fitted to the radially inner surfaces 11c and 12c of the rollers 11 and 12, respectively.

Reference numerals 11d and 12d designated oil grooves, respectively. The distance l between the radially extending, axially inner surfaces of the bush flanges 13a and 14a is longer by from 0.3 to 0.8 mm than the thickness b of the shaft collar 10a.

Reference numeral 15 designates an annular recess which is formed in between the opposing, axially inner ends of the rollers 11 and 12 at the radially outer sides thereof whereby the rollers are united by welding material in said recess 15.

Reference numerals 22a and 22b designate covers, respectively, which are fixed to the shaft 10 by screws 23a and 23b, respectively.

The covers 22a and 22b have collars 17a and 17b, respectively, the axially inner surfaces of which define the oil chambers 18a and 18b, respectively. Floating rings 24a and 24b are inserted in the oil chambers 18a and 18b, respectively, so as to press O-rings 19a and 19b against the radially outer surfaces of the oil chambers 18a and 18b respectively.

The floating rings 24a and 25a are positioned with the axial ends thereof in close contact with each other to form a closed oil chamber 26a. In the same manner, the floating rings 24b and 25b form a closed oil chamber 26b.

Reference numeral 21 designates an oil inlet. Oil is introduced in the device through the oil inlet 21.

Oil flows into the oil chamber 16. Then the oil arrives at the outside surface of the shaft through the oil grooves 11d and 12d.

When the shoe plate 27 is driven, the movement of the shoe plate 27 causes the rollers 11 and 12 to rotate about the shaft 10.

According to the present invention, a pair of rollers 11 and 12 are supported rotatably on the shaft 10 using a single pair of bushes 13 and 14 between the shaft and the rollers. As a result, the track roller device is lighter in weight than a conventional roller and does not require a lot of machine parts for assembly. Also, the oil chamber can be made large in capacity and the side cover onto the shaft can be made small in size, with the result that the volume of oil that can be stored may be made large and accordingly, the frequency for replacing oil in the oil chamber is lessened.

According to the present invention, when a pair of rollers are welded together to form a unitary body, the shaft can be prevented from deformation which might otherwise be caused by the welding, because the oil chamber is provided between the rollers and the shaft, with the result being that the heat generated during welding is poorly conveyed to the shaft.

The embodiments of the invention in which an exclusive property or privilege is claimed are defined as follows:

1. A track roller, comprising: a shaft having a substantially centrally located, annular, shaft collar projecting radially outwardly therefrom at the center of the shaft; a pair of annular bushings rotatably supported on said shaft on opposite sides of said shaft collar, said bushings each having a radially outwardly extending flange at the axially inner end thereof, said flanges being opposed to and being axially spaced small distances from the axial surfaces of said shaft collar, respectively; a pair of coaxial, annular rollers press-fitted on and supported for rotation with respect to said shaft by said bushings directly, respectively, said rollers having adjacent, axially inner, opposed end walls, one of said rollers having a radially outwardly facing, circumferentially extending, outer surface adjacent to the radially outer edge of its axially inner end wall, the other of said rollers having a radially inwardly facing, circumferentially extending, inner surface adjacent to the radially outer edge of its axially inner end wall, said inner surface of said other roller being sleeved on said outer surface of said one roller, said rollers being welded together to form a unitary body, said axially inner opposed end walls of said rollers each having an annular recess therein located radially inwardly from said surfaces, said recesses mating to define an enlarged annular oil chamber encircling the radially outer edge of said shaft collar and locating between the said rollers and the shaft, said rollers having oil flow passages extending from said annular oil chamber to the surface of the shaft.

2. A track roller, comprising: a shaft having a substantially centrally located, annular, shaft collar projecting radially outwardly therefrom; a pair of annular cylindrical bushings rotatably supported on said shaft on opposite axial sides of said shaft collar, said bushings each having cylindrical radially inner and radially outer walls and having a radially outwardly extending flange at the axially inner end thereof, said flanges being opposed to and being axially spaced small distances from the axial surfaces of said shaft collar, respectively; a pair of monolithic, coaxial, annular rollers each having a radially inner cylindrical wall, each said roller being-press-fitted on one of said bushings with sid radially inner cylindrical wall of said roller directly contacting the radially outer wall of its associated bushing, said rollers being supported for rotation with respect to said shaft by said bushings, respectively, said rollers having adjacent, axially inner, opposed end walls, one of said rollers having a radially outwardly facing, circumferentially extending, outer surface adjacent to the radially outer edge of its axially inner end wall, the other of said rollers having a radially inwardly facing, circumferentially extending, inner surface adjacent to the radially outer edge of its axially inner end wall, said inner surface of said other roller being sleeved on said outer surface of said one roller, said rollers being welded together to form a unitary body, said axially inner opposed end walls of said rollers each having an annular recess therein located radially inwardly from said surfaces, said recesses mating to define an enlarged annular central oil chamber encircling the radially outer edges of said shaft collar and said flanges of said bushings, said rollers having oil flow passages extending radially inwardly from said annular oil chamber and penetrating through said radially inner walls of said rollers, said oil flow passages also extending axially along said radially outer walls of said bushings to locations outside of the axially outer ends of said bushings for supplying oil to the surface of the shaft.

3. A track roller according to claim 2, wherein said rollers comprise a first radially inner pair of axially facing, abutting surfaces on said rollers, which first surfaces extend radially outwardly from said lubricant chamber, said circumferentially extending surfaces of said rollers extending axially from the radially outwardmost edges of said first pair of axially facing, abutting surfaces, respectively.

4. A track roller according to claim 3, wherein said rollers further comprise a second radially outer pair of opposing faces defining a radially outer groove opening radially outwardly from said circumferentially extending surfaces of said rollers, said outer groove being filled with welding material.

5. A track roller according to claim 2, wherein the distance between the axially inner surfaces of said radially outwardly extending flanges of said bushings is 0.3 to 0.8 millimeters greater than the thickness of said shaft collar.

* * * * *